United States Patent [19]

Ring et al.

[11] Patent Number: 4,508,765

[45] Date of Patent: Apr. 2, 1985

[54] SYNTHETIC RESINS AND COATING COMPOSITIONS CONTAINING THEM

[75] Inventors: John Ring, Romford; David French, Walthamstow; Michael Hickling, Saffron Walden; Michael G. Sturgess, Addington, all of England

[73] Assignee: International Paint public limited company, London, England

[21] Appl. No.: 429,983

[22] Filed: Sep. 30, 1982

[30] Foreign Application Priority Data

Oct. 20, 1981 [GB] United Kingdom ............... 8131611

[51] Int. Cl.³ .................. C08L 61/14; C08L 61/32; C08L 62/00
[52] U.S. Cl. ............................. 427/386; 427/388.1; 523/402; 523/424; 525/481; 525/485; 525/495; 525/510; 525/511
[58] Field of Search ............... 525/480, 485, 481, 495, 525/524, 523, 510, 511; 523/402, 409, 424; 427/386, 388.1

[56] References Cited

U.S. PATENT DOCUMENTS

| 2,521,911 | 9/1950 | Greenlee | 260/43 |
| 2,521,912 | 9/1950 | Greenlee | 260/59 |
| 2,872,427 | 2/1959 | Schroeder | 523/403 |
| 4,059,550 | 11/1977 | Shimp | 260/29.4 R |
| 4,164,487 | 8/1979 | Martin | 260/29.2 EP |
| 4,178,319 | 12/1979 | Chattha | 525/188 |
| 4,178,320 | 12/1979 | Chattha | 525/188 |
| 4,289,812 | 9/1981 | Martin | 525/523 |

FOREIGN PATENT DOCUMENTS

| 547481 | 10/1957 | Canada | 525/485 |
| 0029339 | 5/1981 | European Pat. Off. . | |
| 0029683 | 6/1981 | European Pat. Off. . | |
| 0030093 | 6/1981 | European Pat. Off. . | |
| 0032554 | 7/1981 | European Pat. Off. . | |
| 2555412 | 6/1976 | Fed. Rep. of Germany | 525/472 |
| 2034319 | 6/1980 | United Kingdom . | |
| 1597610 | 9/1981 | United Kingdom . | |

OTHER PUBLICATIONS

George G. Velten, *Epoxy Resin Technology*, pp. 240–246.

Primary Examiner—Allan M. Lieberman
Attorney, Agent, or Firm—Steele, Gould & Fried

[57] ABSTRACT

A heat curable water dispersible film-forming synthetic resin useful in aqueous coating compositions for coating metal substrates, particularly cans used for food and beverages, comprises the reaction product of a water insoluble phenolic resin or a water insoluble amino resin with an epoxy resin and a phosphoric acid.

22 Claims, No Drawings

SYNTHETIC RESINS AND COATING COMPOSITIONS CONTAINING THEM

This invention relates to film-forming synthetic resins and to coating compositions containing them.

Coating compositions containing an epoxy resin with a phenolic resin or an amino resin are used for various purposes, particularly for coating metal. For example they are used for coating the interior or exterior of tin-plate or aluminium cans used for food and beverages, providing a cured coating with good adhesion to metal and resistance to hydrolysis. Coating compositions based on a phenolin resin and an epoxy resin have for example been used for coating the interior of food cans. In addition to their good resistance to hydrolysis they exhibit particularly good resistance to sulphur staining when the lacquered can is heated in contact with the foodstuff.

Known coating compositions based on epoxy resins with phenolic or amino resins have taken the form of solutions in volatile organic solvents. Epoxy resins are generally water insoluble, as are the phenolic and amino resins preferred for use in can coatings.

In such coating compositions the epoxy resin is not generally reacted with the phenolic or amino resin before the coating is applied to a substrate, but is heat cured on the substrate. Examples of such coating compositions are described by G. G. Velten in "Epoxy Resin Technology" (published by Interscience 1968) at pages 240-246. Coating compositions based on volatile organic solvents are however being regarded with increasing disfavour because the evaporated solvent causes atmospheric pollution and the cost of organic solvents is rapidly increasing.

European Patent Application No. 32,554 describes water dilutable coatings based on a blend of water dilutable polyester resin with a phosphoric or phosphonic acid ester of an epoxy resin. The coatings can contain a water soluble amino resin or phenolic resin as cross linking agent. The water soluble resins which are used in the coatings of EPA No. 32,554 have less resistance to hydrolysis and to chemicals than the water insoluble phenolic resins preferred for use in solvent based epoxy phenolic coatings.

A heat-curable water-dispersible film-forming synthetic resin composition according to the invention is the reaction product of a water insoluble phenolic resin or a water insoluble amino resin with an epoxy resin and a phosphoric acid.

We believe that the heat-curable water-dispersible film-forming resin composition contains a condensation product of the phenolic or amino resin with the epoxy resin and that the condensation product is substituted by sufficient acidic phosphate groups to render it water-dispersible. The acidic phosphate groups may be formed by the reaction of epoxy groups with the phosphoric acid.

The synthetic resin composition of the invention can be dispersed in water in the presence of a base to give a stable dispersion useful as a water-based coating composition either alone or mixed with one or more other water-dispersible resins. Coating compositions containing the synthetic resin compositions of the invention can adhere well to metal and retain this adhesion when the coated metal is heated in the presence of moisture, as may be encountered in pasteurization or sterilization of canned food or beverages.

The phenolic resin used in the present invention is a condensation product of a phenol and an aldehyde and is preferably a resole prepared by the reaction of 1 mole of a phenol with 1-3 moles of formaldehyde. The phenol constituent can be phenol itself or all or part of the phenol can be replaced by a substituted phenol, for example an ortho-cresol, para-tertiary-butyl phenol, or para-nonyl phenol. Resoles made from such substituted phenols are generally less highly functional than resoles formed from formaldehyde and phenol itself. The use of a less highly functional phenolic resin may be preferred when it is desired to incorporate a high proportion of phenolic resin in the coating composition. The phenolic resin can be wholly or partly etherified, for example its hydroxymethyl groups can be methylated or butylated.

Such preferred phenolic resoles are water insoluble and are generally similar to the phenolic resins used in known chemically and hydrolytically resistant solvent-based coating compositions. The synthetic resin compositions of the present invention prepared using the preferred phenolic resins described above can form water-dilutable coating compositions having a resistance to chemicals and to hydrolysis and an adhesion to metal which is substantially equal to that of solvent based phenolic resin epoxy resin coatings.

The epoxy resin preferably has an epoxy equivalent weight (weight per epoxide group) of 170-5000. The preferred type of epoxy resin is a condensed glycidyl ether of a bisphenol, for example that formed by the reaction of 2,2-bis(para-hydroxy phenyl)-propane (bisphenol A) with epochlorhydrin. The epoxy resin should preferably contain on average at least 1.1 epoxide groups, most preferably 1.2-2.0 epoxide groups, per molecule. Examples of preferred epoxy resins are those sold under the Trade Marks Epikote 1004, Epikote 1007, Dow DER 668 and Dow DER 664, although lower molecular weight epoxy resins such as Epikote 828 and Epikote 1001 can also be used.

The phosphoric acid is most conveniently in the form of commerical anhydrous orthophosphoric acid or aqueous phosphoric acid having a concentration of at least 60 percent but condensed forms of phosphoric acid such as pyrophosphoric acid can be used as can phosphoric acid semi-hydrate $2H_3PO_4.H_2O$.

The reaction between the phenolic resin, the epoxy resin and the phosphoric acid can be carried out in various ways provided that the synthetic resin composition produced is water-dispersible. In general the reaction includes a heating step at a temperature of at least 50° C. when the phenolic resin and epoxy resin are both present, so that sufficient condensation can take place between them to render the phenolic resin dispersible in water through the acidic phosphate groups formed on the epoxy resin.

In one process for making the synthetic resin composition of the invention the phenolic resin and epoxy resin are reacted, preferably in a proportion of 2-10 moles of epoxy resin for each mole of phenolic resin, under conditions sufficient to consume substantially all the reactive hydroxyl groups of the phenolic resin while leaving some free epoxy groups for reaction with phosphoric acid. The reaction is preferably carried out in a water-miscible organic solvent, for example an alcohol such as butanol or ethanol, an ether alcohol such as 2-ethoxyethanol, 2-methoxyethanol or 2-butoxyethanol, an ester such as ethyl acetate, butyl acetate or 2-ethoxyethyl acetate and/or an aromatic hydrocarbon such as xylene or toluene, at a temperature of 50°–120° C. for 0.5–15 hours, preferably 70°–100° C. for 1–8 hours. The reaction product is reacted with a phosphoric acid to introduce acidic phosphate groups. The reaction between epoxy groups and phosphoric acid is strongly exothermic and care should be taken to avoid overheating.

In an alternative process the epoxy resin is gradually added to a mixture of the phenolic resin and the phosphoric acid so that the phenolic resin acts as a diluent for the epoxy phosphoric acid reaction. The phenolic resin is usually in the form of a solution in an organic solvent, for example a water-miscible solvent as described above, although a solventless liquid phenolic resin can be used. In this process phosphation of the epoxy groups and condensation of the phenolic resin with the epoxy resin can take place simultaneously, although we prefer to include a heating step at at least 60° C. to ensure condensation after all the epoxy resin has been added, for example heating at 80°–120° C. for 0.5–10 hours.

Alternatively, the epoxy resin can be dissolved in a solution of the phenolic resin, without heating to cause reaction, and the phosphoric acid can be gradually added to the mixed resins of high molecular weight. The reaction mixture is preferably heated at at least 60° C., for example 80°–120° C. for 0.5–10 hours, after all the phosphoric acid has been added, to effect condensation of the phenolic resin with the phosphated epoxy resin.

In a further alternative the epoxy resin can be reacted with a controlled amount of phosphoric acid to introduce acidic phosphate groups before it is reacted with the phenolic resin but this is not preferred.

The condensation product of the phenolic resin and epoxy resin comprises polymer molecules in which a phenolic resin moiety is bonded to one or more epoxy resin units. Many of the epoxy resin units contain acidic phosphate groups formed by the reaction of epoxy groups with phosphoric acid, or contain unreacted epoxy groups if phosphation is to be carried out in a subsequent reaction. The condensation product may also contain some unreacted epoxy resin and some polymer molecules where phenolic resin moieties are joined by epoxy resin units.

The amount of phosphoric acid used is generally 0.5–15 percent by weight based on the total synthetic resin in the composition, provided that sufficient phosphoric acid is used to render the composition water-dispersible. 2–12 percent by weight phosphoric acid is preferred.

Using the above processes the synthetic resin composition of the invention is generally produced in solution in an organic solvent. To form a water-based coating composition a base is preferably added to the reaction product to neutralize at least partially the acidic phosphate groups of the synthetic resin. The base can for example be ammonia or an amine and is generally added to the reaction product in the form of an aqueous solution. Tertiary amines are preferred, for example triethylamine, triethanolamine or dimethylaminoethanol. In a preferred procedure the base is added as a dilute solution in sufficient water to convert the coating composition to a stable dispersion having a mainly aqueous continuous phase which can be further diluted with water without loss of dispersion stability. The amount of base used is preferably 50–130 percent of the amount required to neutralize the acidic phosphate groups in the synthetic resin. The dispersion formed after addition of base and water can be used directly in a coating composition or can be further diluted with the water to the required viscosity. If desired, the organic solvent used in the preparation of the synthetic resin can be wholly or partly removed from the composition and recovered. For example butanol, ethyl acetate and/or xylene can be removed from the coating composition by azeotropic distillation.

Coating compositions based on synthetic resin compositions of the invention formed from phenolic resins are suitable for coating metallic substances such as steel, tinplate or aluminium, for example paint cans and cans for food and beer or other beverages. They can be used alone or in conjunction with one or more other heat curable water-dispersible synthetic resins. They are particularly suitable for coating the inside surface of food cans. One preferred coating composition comprises an aqueous dispersion of a synthetic resin composition according to the invention and a water dispersible epoxy resin. Examples of water-dispersible epoxy resins are epoxy acrylic resins, such as those described in U.K. Published Patent Application No. 2,059,698, U.S. Pat. No. 4,212,781, European Patent Application No. 0,006,336 or our copending British Patent Application No. 8122992, or phosphated epoxy resins. The coatings have excellent adhesion to tinplate, steel and aluminium and resist hydrolysis during pasteurization of canned food and beverages. The synthetic resin compositions of the invention are particularly useful as a method of providing phenolic resins for such coating compositions in water-dispersible form.

The weight ratio of phenolic resin to epoxy resin in the compositions of the invention is preferably at least 1:20. Where the compositions are to be mixed with a water-dispersible epoxy resin to produce coating compositions the phenolic to epoxy ratio in the compositions of the invention is generally at least 1:5 and preferably at least 1:3, most preferably 1:2 to 2:1, by weight. Where the compositions of the invention are intended to be used alone as water soluble epoxy phenolic coatings the weight ratio of phenolic to epoxy resin is generally 1:20 to 1:3, preferably 1:15 to 1:10.

Amino resins which can be used to prepare synthetic resin compositions according to the invention are resins formed by the reaction of a compound containing amine groups, for example urea, a substituted urea, melamine or benzoguanamine, with an aldehyde, for example formaldehyde.

Urea formaldehyde resins are preferred. At least some of the methylol groups of the amino resin are preferably etherified, for example by methyl or butyl groups.

The amino resin, epoxy resin and phosphoric acid can be reacted by any of the processes described above in connection with phenolic resins and in similar amounts. That is, an epoxy resin can be added to a mixture of amino resin and phosphoric acid or the amino resin and epoxy resin can be condensed and then phosphated. The synthetic resin composition formed can be diluted with water and a base to form a coating composition. Coatings comprising an epoxy resin and an amino resin may be used for coating metal articles such as the exterior of food and beverage cans. The weight ratio of amino resin to epoxy resin in the compositions of the invention is generally at least 1:20, for example 1:15 to 1:3.

Coating compositions according to the invention are preferably applied to the substrate as a spray but can also be applied by dip coating, anionic electro-coating, direct or reverse roller coating, flow coating or rinse coating. The coating is preferably heated at 100° C.–240° C. for 5 seconds to 10 minutes to effect curing, temperatures of 180° C.–210° C. being most preferred.

The invention is illustrated by the following examples.

EXAMPLE 1

3500 g of a 40 percent by weight solution in n-butanol of a water-insoluble butylated phenol formaldehyde resin of phenol:formaldehyde molar ratio 1:2.5 was charged to a reactor equipped with stirrer, reflux condenser, thermometer and addition funnel and 400 g of 85 percent by weight aqueous phosphoric acid was added. 3808 g of 'Epikote 828' epoxy resin (equivalent weight per epoxide group 180–200) was gradually added over 1.5 hours. After addition was complete, the reaction mixture was heated at 80° C. for 3 hours. The product was a phosphated phenolic epoxy condensate which could be dispersed in water when neutralized with a base. It was suitable as a phenolic crosslinker for use in a water-based epoxy resin coating.

The reaction product was cooled to ambient temperature and dimethylaminoethanol was added to 100 percent neutralization. Water was then added to give an overall solids content of 25 percent by weight. The aqueous coating composition formed had a viscosity of 0.5–1.0 poise, a pH of 6.5 to 7.5 and a water:solvent ratio of 80:20 by weight.

EXAMPLE 2

92.5 g of a 50 percent by weight solution in n-butanol of a water-insoluble butylated o-cresol-phenol-formaldehyde resin of phenols:formaldehyde molar ratio 1:2.5 was mixed with 342.5 g of 2-butoxy-ethanol in a reactor of the type used in Example 1. 750 g of 'Epikote 1007' epoxy resin (equivalent weight per epoxide group 1700–2050) was added and the mixture was warmed to dissolve the epoxy resin. 18.9 g of 85 percent by weight aqueous phosphoric acid was mixed with 50 g of 2-butoxyethanol and added to the resin solution over 3 hours. After all the phosphoric acid had been added, the reaction mixture was heated at 80° C. for 5 hours.

After the reaction mixture had cooled, 33.82 g of dimethylaminoethanol was added (neutralization level 100 percent) and stirred for 15 minutes. 1927 g of demineralised water was then added to produce a water-based epoxy phenolic lacquer of solids content 25 percent by weight, viscosity 0.5–1.5 poise, pH 6.5–7.5 and water:-solvent ratio 80:20 by weight.

EXAMPLE 3

96.72 g of a 67 percent by weight solution of a urea formaldehyde resin in a xylene/butanol mixture (BE 610 sold by British Industrial Plastics Ltd) and 19.56 of 85 percent by weight aqueous phosphoric acid were charged to a reactor of the type used in Example 1. 750 of 'Epikote 1004' epoxy resin (equivalent weight per epoxide group 850–950) was dissolved in 388.8 g of 2-butoxyethanol and this solution was gradually added to the reactor over 4 hours. After all the epoxy resin had been added, the reaction mixture was heated at 90° C. for 5 hours.

The reaction mixture was cooled and 78.11 g of dimethylaminoethanol was added and stirred for 15 minutes. 1995 g of demineralised water was then added to produce a water-based epoxy amino resin lacquer of solids content 25 percent by weight, viscosity 0.5–1.0 poise, pH 6.5–7.5 and water:solvent ratio 80:20 by weight.

What is claimed is:

1. A heat-curable water-dispersible film-forming synthetic resin composition which is the reaction product of a water insoluble resin, selected from the group consisting of phenolic resins which are condensation products of a phenol and an aldehyde and amino resins which are formed by the reaction of a compound containing amine groups with an aldehyde, with an epoxy resin and from 0.5 to 15 percent by weight of a phosphoric acid based on the total synthetic resin in the composition, the weight ratio of the said water insoluble resin to the epoxy resin in the composition being from 1:20 to 2:1.

2. A synthetic resin composition according to claim 1, which contains a condensation product of the phenolic or amino resin with the epoxy resin, the condensation product being substituted by sufficient acidic phosphate groups to render the synthetic resin composition water-dispersible.

3. A synthetic resin composition according to claim 1, in which the epoxy resin has an epoxy equivalent weight of from about 170 to about 5000 and contains on average from about 1.2 to about 2.0 epoxide groups per molecule.

4. A synthetic resin composition according to claims 1, in which the epoxy resin is a condensed glycidyl ether of a bisphenol.

5. A synthetic resin composition according to claim 1, in which the water-insoluble resin is a phenolic resin which is a resole prepared by the reaction of one mole of a phenol with from about 1 to about 3 moles of formaldehyde.

6. A synthetic resin composition according to claim 5, in which at least part of the phenol is an ortho- or para-alkyl substituted phenol.

7. A synthetic resin composition according to claim 5, in which the phenolic resin is at least partly etherified.

8. A synthetic resin composition according to claim 1, in which the water-insoluble resin in an amino resin which is a urea formaldehyde resin.

9. A synthetic resin composition according to claim 8, in which the ratio of amino resin to epoxy resin is from about 1:15 to about 1:3 by weight.

10. A process for the preparation of a heat-curable film-forming synthetic resin composition comprising reacting an epoxy resin with a water insoluble resin, selected from the group consisting of phenolic resins which are condensation products of a phenol and an aldehyde and amino resins which are formed by the reaction of a compound containing amine groups with an aldehyde, in a weight ratio of the said water insoluble resin to epoxy resin of 1:20 to 2:1 and with 0.5 to 15% by weight of a phosphoric acid based on the total synthetic resin in the composition, the reaction including a heating step at a temperature of at least 50° C. when the water insoluble resin and the epoxy resin are both present, to produce a water dispersible reaction product.

11. A process according to claim 10, in which the amount of phosphoric acid used is from about 2 to about 12 percent by weight based on the total synthetic resin in the composition.

12. A process according to claim 10, in which the epoxy resin is gradually added to a mixture of the water-insoluble resin and the phosphoric acid.

13. A process according to claim 12, in which the water-insoluble resin is a phenolic resin in the form of a solution in a water miscible organic solvent.

14. A process according to claim 12, in which the reactants are heated at a temperature of from about 80° to about 120° C. for a period of time of from about 0.5 to about 10 hours after all the epoxy resin has been added.

15. A process according to claim 10, in which the water-insoluble resin and the epoxy resin are reacted under conditions sufficient to consume all the reactive hydroxyl groups of the water-insoluble resin while leaving some free epoxy groups and the product of the reaction is reacted with a phosphoric acid.

16. A process according to claim 10, in which the water-insoluble resin is a phenolic resin, the epoxy resin is dissolved in a solution of the phenolic resin in an organic solvent and the phosphoric acid is gradually added to the mixed resin solution.

17. A process according to claim 16, in which the reaction mixture is heated at a temperature of from about 80° to about 120° C. for a period of time of from about 0.5 to about 10 hours after all the phosphoric acid has been added.

18. A synthetic resin composition according to claim 1, dispersed mainly in a aqueous continuous phase in the presence of a base which neutralizes at least partially the acidic phosphate groups of the synthetic resin to form an aqueous coating composition.

19. A synthetic resin composition according to claim 18, in which the amount of base used is from about 50 to about 130 percent of that sufficient to neutralise the acidic phosphate groups in the synthetic resin.

20. A synthetic resin composition according to claim 1, dispersed together with a water-dispersible epoxy resin in a mainly aqueous continuous phase in presence of a base which neutralizes as least partially the acidic phosphate groups of the synthetic resin to form an aqueous coating composition.

21. A synthetic resin composition according to claim 20, in which the water-dispersible epoxy resin is an epoxy acrylic resin.

22. A process for coating a metal substrate comprising the steps of:
preparing a heat-curable water dispersible film-forming synthetic resin composition by reacting a water insoluble resin, selected from the group consisting of phenolic resins which are condensation products of a phenol and an aldehyde and amino resins which are formed by the reaction of a compound containing amine groups with an aldehyde, with an epoxy resin and from 0.5 to 15 percent by weight of a phosphoric acid based on the total synthetic resin in the composition, the weight ratio of said water insoluble resin to said epoxy resin in the composition being from 1:20 to 2:1; and dispersing the reaction product in a mainly aqueous continuous phase in the presence of a base which neutralizes at least partially the acidic phosphate groups of the synthetic resin and optionally a water-dispersible epoxy resin;
applying said composition to a metal substrate; and,
heating said composition at a temperature of from about 100° C. to about 240° C. for a period of time of from about 5 seconds to about 10 minutes to effect curing.

* * * * *